United States Patent

[15] 3,648,112

Beckwith

[45] Mar. 7, 1972

[54] VOLTAGE BALANCE RELAY CIRCUIT

[72] Inventor: Robert W. Beckwith, 1002 Greenfield Lane, Mount Prospect, Ill. 60050

[22] Filed: Aug. 24, 1970

[21] Appl. No.: 66,486

[52] U.S. Cl. ........................................... 317/27 R, 328/133
[51] Int. Cl. ..................................................... H02h 3/26
[58] Field of Search ..................... 317/27 R, 47; 340/253 H; 328/133

[56] References Cited

UNITED STATES PATENTS 3,155,880  11/1964  Salina .................................. 317/27 X
3,535,589  10/1970  Bourgeault ........................... 317/27 X Primary Examiner—James D. Trammell
Attorney—Stone, Zummer, Livingston & Aubel

[57] ABSTRACT

A protective circuit for an electric polyphase system for indicating conditions of voltage unbalance between the phases, and for actuating a relay in response thereto.

4 Claims, 3 Drawing Figures

Patented March 7, 1972

3,648,112

Inventor
Robert W. Beckwith
By Stone, Zummer, Livingston & Aubel attys.

VOLTAGE BALANCE RELAY CIRCUIT

Phase unbalance in a three-phase electrical system may occur for example with unequal single-phase loading of one or two phases of the three-phase system. Such unbalance can cause three-phase motors to run at temperatures above their rating with resulting deterioration of insulation and decreased life.

Phase failure, which is an extreme instance of phase unbalance, in a three-phase electrical system may occur for a number of reasons such as when the circuit is struck by lightning, a fuse blows, or as a result of a mechanical failure which opens one line of the system. A three-phase motor which is operating at the time of a single phase failure will continue to run but draws increased current through the remaining two lines resulting in the possible overheating.

Accordingly, it is an object of the present invention to provide an improved circuit for detecting a phase unbalance.

It is another object of the present invention to provide an improved circuit capable of actuating a relay in response to a voltage unbalance.

An unbalanced voltage condition may be common in certain industrial plants and the inventive circuit can be used to give an alarm and permit balancing the load before overheating or automatic turnoff of motors.

In other cases, motors may be protected by a fuse in each of the three-phase lines. If one fuse blows, the motor will continue to run with the remaining single phase input, but will overheat. Moreover if the fuse blew due to a short circuit, the motor will generate partial voltage on the open phase, feeding current to the short, and causing damage and possible fire. The inventive circuit may be used to detect the voltage unbalance, which results after a blown fuse, and trip the motor starter removing the remaining voltage to the motor.

In other cases, the inventive circuit may be used to detect unbalance on a circuit feeding a number of motors. Otherwise a blown fuse on one motor could cause damage to all motors on a circuit.

The foregoing and other features and advantages of the invention will be apparent from the following more particular description as illustrated in the accompanying drawings wherein.

Figure 1:
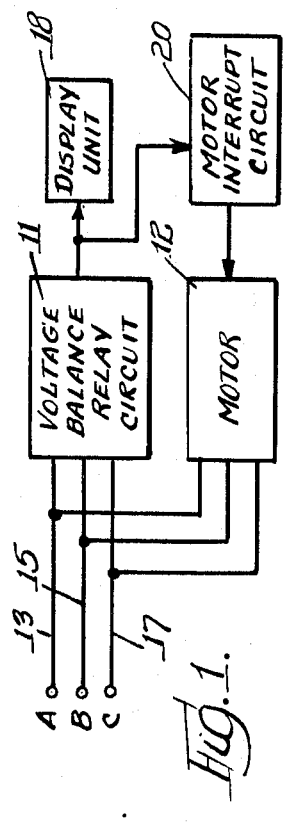
FIG. 1 is a block diagram showing the relative connections of the voltage balance circuit of the invention with an associated motor, display unit and motor interrupt circuit.

Referring to FIG. 1, the input from a three-phase, three-wire system with phases labeled as A, B and C is coupled through conductive lines 13, 15 and 17 to a three-phase motor 12 and parallel to the voltage balance relay circuit 11 which is the subject matter of the invention. The output of the voltage balance relay circuit 11 is coupled to a display unit 18 of any suitable known type and which can be simply a display light. The voltage balance relay circuit 11 may also be connected to a motor interrupt circuit 20 which can in turn be connected to the motor circuit to turnoff the motor 12.

As explained hereinafter, the voltage balance relay circuit 11 has a built in time delay so that transients and momentary voltage unbalances are filtered out, and so that display unit 18 and interrupt circuit 20 are not activated during such transients and momentary unbalances.

Figure 2:
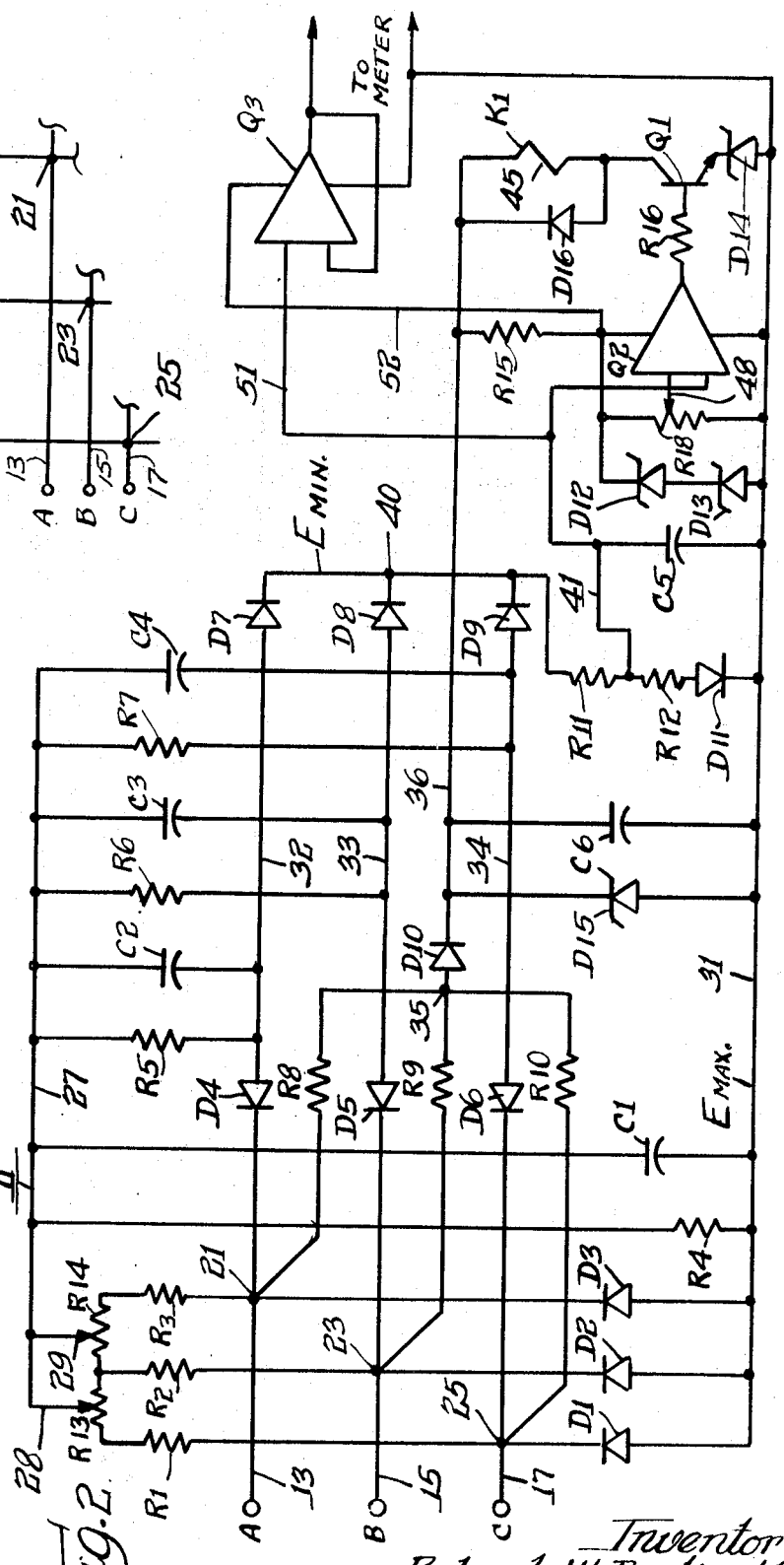
FIG. 2 is a schematic diagram of the voltage balance circuit of the invention.

The circuit diagram of the voltage balance relay circuit 11 is shown in FIG. 2. The circuit connections will first be described with reference to FIG. 2 and then the operation of the circuit will be described.

In FIG. 2, lines 13, 15 and 17 connect to the circuit 11 at terminal points 21, 23 and 25 respectively. Terminal points 21, 23 and 25 are connected respectively through resistors R1, R2 and R3, and through trimmer potentiometers R13 and R14 to a first or sensing neutral conductive line 27. Resistor R1 is connected through a portion of potentiometer R13 and variable tap 28 to neutral line 27; resistor R2 is connected to the junction of potentiometers R13 and R14; and, resistor R3 is connected through a portion of resistor R14 and variable tap 29 to neutral line 27. The trimmer potentiometers R13 and R14 permit the proper balancing of the bridge circuit of resistor R1, R2 and R3 such that these latter resistors need not be held to such close tolerances relative to one another. Terminal points 21, 23 and 25 are also connected respectively through diodes D3, D2 and D1 to a conductive line 31.

Resistor R4 and capacitor C1 are connected across line 31 to neutral line 27. Resistor R1, R2 and R3 together with their respective diodes D1, D2 and D3 develop a negative voltage at conductive line 31 relative to the artificially developed neutral reference at line 27. That is, a voltage is developed across resistor R4 and capacitor C1 which is proportional to the highest or largest phase-to-neutral voltage; and which voltage is indicated at Emax in FIG. 2.

Terminal point 21 is also connected through a diode D4 and line 32 to a RC circuit comprising a resistor R5 and capacitor C2; terminal point 23 is connected through to diode D5 and line 33 to an RC circuit comprising a resistor R6 and capacitor C3; and, terminal point 25 is connected through diode D6 and line 34 to an RC circuit comprising a resistor R7 and a capacitor C4. The other terminal of each of the foregoing RC circuits is connected to neutral line 27.

The combination of diode D4, resistor R5 and capacitor C2 develops a negative voltage at line 32 proportional to the phase A-to-neutral voltage. Similarly the combination of diode D5, R6 and C3; and the combination of diode D6, R7 and C4 develop a negative voltage at lines 33 and 34 respectively proportional to the phase B-to-neutral, and phase C-to-neutral voltage.

Lines 32, 33 and 34 are connected through respective diodes D7, D8 and D9 to a common terminal 40. The minimum voltage on lines 32, 33 or 34, that is the minimum voltage across the respective RC circuits, will cause terminal point 40 to move up to that potential; indicated in FIG. 2 as E min.

Terminals 21, 23 and 25 are also respectively connected to one end of resistors R8, R9 and R10. The other end of resistors R8, R9 and R10 are connected in common. Resistors R8, R9 and R10 form a second or power neutral at common point 35 to provide power to the relay K1 through diode D10 and line 36. The potential at terminal point 35 varies with the current flowing in line 36, which in time varies dependent on the current flowing through the relay K1, hence the voltage on line 36 must be separated from the sensing neutral on line 27.

A voltage limiting Zener diode D15 is connected across lines 36 and 31 and a capacitor C6 is connected in parallel to diode D15.

The diode D10 enables capacitor C6 to charge to the peak potential across lines 36 and 31 through resistors R8 and diode D3; or through resistor R9 and diode D2; or through resistor R10 and diode D1 while yet preventing reverse flow through R8, R9 or R10 during those parts of the cycle when the neutral voltage at point 35 is less than the DC voltage across capacitor C6.

The voltage E min at terminal 40 is compared with the voltage E max on line 31 by the following circuit. Terminal point 40 is connected through resistors R11, R12 and a diode D11 to line 31. The junction of resistors R11 and R12 connects through lead 41 and across capacitor C5 as one input to a differential amplifier Q2 of any suitable known design such as a Fairchild uA741C.

The voltage balance circuit 11 would normally be mounted on the motor panel in an environment which may be susceptible to large variations in temperature. Accordingly, it is desirable that the voltage balance relay be temperature stable. It was noted that there is a temperature dependent drop through diodes D7, D8 and D9 especially near the balance level. In order to compensate for this drop the series circuit of the two resistors R11 and R12 of equal resistance and the diode D11 are connected from terminal point 40 to line 31. In operation, assume that with increasing temperature the voltage drop across diodes D7, D8 and D9 changes, the voltage at terminal 40 which is junction of the cathodes of diodes D7, D8, D9 and resistor 11 will move up. However the drop across diode D11 will also change and the voltage at the junction of the cathode of diode D11 and resistor R12 will move down. Because of this compensating variation, the voltage at the junction of resistors R11 and R12 will remain relatively stable in spite of temperature changes.

Differential amplifier Q2 receives its power through resistor R15 from line 36. Resistor R15 also connects through a variable resistor R18 to line 31. A variable tap 48 on resistor R18 connects to the other input of amplifier Q2 to provide a sensitivity adjustment which determines at what percentage change in rated voltage the amplifier Q2 will be caused to operate and relay K1 to be activated. One selected setting has been to set tap 48 to detect or sense a 5 percent change in rated voltage input on any phase.

Zener diodes D12 and D13 are connected in series with each other and across resistor 18 to limit the voltage applied to Q2. The output of differential amplifier Q2 is connected through resistor R16 as an input to the base of a common emitter connected NPN transistor Q1. The collector of Q1 is connected to the coil 45 of the relay K1. A diode 16 connected across coil K1 dampens the inductive kick of coil 45. A Zener diode D14 is connected from the emitter of transistor Q1 to line 31.

As mentioned above, the circuit 11 includes a time delay factor. Capacitor C5 and the resistor 11 delay the voltage buildup between terminal point 40 and line 31 to provide a time delay to prevent false operation of the relay K1 due to transient or momentary phase unbalance. A time delay of say 20 seconds can be provided to operate the relay K1 during a period of slight unbalance, and a time delay of say 2 seconds for complete loss of one phase.

The operation of the circuit will now be briefly explained. Assume a normal operation wherein the voltage of phases A, B and C are equal. In this case the potentials at terminal point 21, 23 and 25 will be equal and the voltage across the neutral line 27 to line 31; that is, Emax will be essentially the same as the voltage on terminals 21, 23 and 25.

The voltages developed on lines 32, 33 and 34; that is, the voltage across C2, C3 and C4 will also be equal to each other, and will be equal to the voltage at terminal points 21, 23 and 25. The voltage Emin at terminal point 40 will be essentially equal to the voltage at terminal points 21, 23 and 25 and hence the relation is Emin = Emax. Accordingly the voltage across capacitor C5 and the associated resistor will be essentially zero, and differential amplifier Q2 will remain unenergized.

If one of the phase voltages, say phase A, decreases more than 5 percent of its rated voltage while the voltages on the other phases remain the same, the voltage Emax will remain the same. Note that Emax is proportional to the maximum voltage at any of terminal points 21, 23 or 25. However, the voltage appearing on line 32 proportional to the voltage on phase A will be decreased hence the voltage E min at terminal point 40 will rise to a less negative level and, accordingly, a voltage which may be expressed as the difference between Emin and Emax will be developed across resistor R12 and diode D11 and capacitor C5. If the unbalance exists for more than a preselected period of time, the capacitor C5 will be charged to this potential Emin–Emax and cause differential amplifier Q2 to be energized in turn providing a voltage to cause transistor Q1 to conduct and energize the coil 45 of relay K1 through the circuit including line 36, diode D10 and parallel connected resistors R8, R9 and R10. Relay coil 45 will continue to be energized and relay 31 will remain in its activated position until the circuit power is turned off.

In FIG. 1, an additional amplifier Q3 similar to Q2 may be connected to the circuit via lines 51 and 52. Amplifier Q3 is useful, as indicated, when it is desired to connect an output of the circuit of FIG. 1 to an associated, indicating or recording meter. In case the relay K1 is not required, the meter can be connected directly to Q2.

Figure 3:
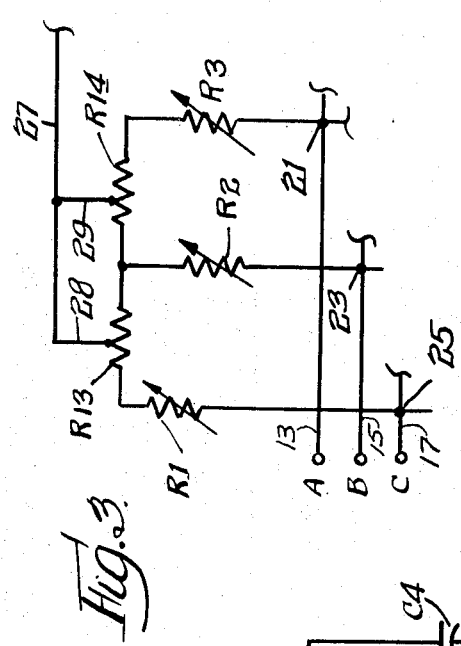
FIG. 3 is a schematic diagram of a modification of the voltage balance circuit shown in FIG. 2.

A minor modification of the circuit is shown in FIG 3 wherein resistors R1, R2 and R3 are made variable to provide an initial balancing of the circuit as described above. In FIG. 3 units R13 and R14 need not be variable since sufficient variation of resistance is provided by units R1, R2 and R3.

While the invention has been particularly shown and described with reference to a preferred embodiments thereof, it will be understood by those skilled in the art that various changes in form and details may be made therein without departing from the spirit and scope of the invention. For example, the inventive circuit is also applicable for a system having a number of phase inputs N greater than three. In this latter case a diode-resistor combination (note R1–D1, R2–D2, R3–D3 in FIG. 1) is provided for each input and connected to develop a neutral reference voltage and to have a common connection to develop the maximum amplitude voltage. RC networks (note R5–C2, R6–C3 and R7–C4 in FIG. 1) are included for developing the N phase-to-neutral voltages proportional to the minimum amplitude of each of said N input voltages. The associated relay and indicator such as shown in FIG. 1 will respond to the difference between the maximum and minimum voltages on the N phase leads to neutral voltages.

I claim:

1. A circuit for sensing voltage unbalance between the various phase voltages in a three phase-three wire electrical line system comprising, in combination, means for developing an artificial neutral reference, means for developing a phase to neutral voltage proportional to the maximum amplitude of any of said phase voltages, means for developing a phase to neutral voltage proportional to the minimum amplitude of any of said phase voltages, and means for comparing said minimum and maximum voltages and developing an output voltage proportional to the difference between said minimum and maximum voltages.

2. A circuit as in claim 1 wherein said means for developing said neutral reference comprise resistor means connected in series to diode means, said phase voltages being coupled to the junction of respective ones of said resistor and diode means, said resistor means connected to provide said neutral reference, and said diodes having a common connection to provide said maximum amplitude voltage.

3. A circuit as in claim 1 further including a temperature compensating network including diode means connecting the separate phase voltages to a common terminal, a series circuit comprising a second diode and resistor means connected between said common terminal and the maximum voltage potential, output means connected to an intermediate point of said resistor means whereby in response to temperature changes said second diode pulls the voltage at one end of said resistor means opposite to the direction which said diode means pull the other end of said resistor means to thereby tend to maintain the voltage at said intermediate point stable.

4. A circuit as in claim 1 further including potentiometer having means connected intermediate, said reference neutral for providing initial balancing of said phase voltages, said potentiometer having variable first resistor means connected to one terminal of said potentiometer, a second resistor means connected to the other terminal of said potentiometer, and a third resistor means connected to a center point on said potentiometer whereby a balance is obtained of said phase voltage by adjustment of said variable taps.

* * * * *